(12) United States Patent
Ventrapragada et al.

(10) Patent No.: US 10,194,306 B2
(45) Date of Patent: Jan. 29, 2019

(54) TECHNIQUES AND APPARATUSES FOR SUPPRESSING NETWORK STATUS INFORMATION NOTIFICATIONS

(71) Applicant: QUALCOMM Incorporated, San Diego, CA (US)

(72) Inventors: Ravi Kanth Ventrapragada, Hyderabad (IN); Nagarjuna Chaganti, Hyderabad (IN); Sivakanth Vaka, Hyderabad (IN); Nirupama Locanindi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/406,228

(22) Filed: Jan. 13, 2017

(65) Prior Publication Data

US 2018/0206103 A1     Jul. 19, 2018

(51) Int. Cl.
| | |
|---|---|
| *H04W 8/00* | (2009.01) |
| *H04W 8/22* | (2009.01) |
| *H04W 52/02* | (2009.01) |
| *H04W 68/00* | (2009.01) |
| *H04M 1/60* | (2006.01) |
| *H04M 15/00* | (2006.01) |
| *H04M 1/725* | (2006.01) |
| *H04W 88/02* | (2009.01) |

(52) U.S. Cl.
CPC ............ *H04W 8/005* (2013.01); *H04W 8/22* (2013.01); *H04W 52/028* (2013.01); *H04M 1/6091* (2013.01); *H04M 1/72597* (2013.01); *H04M 15/60* (2013.01); *H04W 68/00* (2013.01); *H04W 68/005* (2013.01); *H04W 88/02* (2013.01)

(58) Field of Classification Search
CPC ............... H04M 1/6091; H04M 15/60; H04M 1/72597; H04W 4/001; H04W 68/00; H04W 68/005; H04W 88/02
USPC ....................... 455/414.1, 414.2, 422.1, 434
See application file for complete search history.

(56) References Cited

U.S. PATENT DOCUMENTS

| | | | |
|---|---|---|---|
| 8,417,246 | B2 | 4/2013 | Olofsson et al. |
| 9,148,825 | B2 | 9/2015 | Choi et al. |
| 9,332,449 | B2 | 5/2016 | Park et al. |
| 9,467,903 | B2 | 10/2016 | Jeong et al. |
| 2008/0064393 | A1 | 3/2008 | Oommen et al. |
| 2009/0131074 | A1* | 5/2009 | Minier .............. H04W 52/0225 455/456.1 |
| 2012/0196604 | A1 | 8/2012 | Ohmoto |

(Continued)

OTHER PUBLICATIONS

International Search Report and Written Opinion—PCT/US2018/012268—ISA/EPO—Jun. 12, 2018.

*Primary Examiner* — Jaime Holliday
(74) *Attorney, Agent, or Firm* — Qualcomm Incorporated

(57) ABSTRACT

Certain aspects of the present disclosure generally relate to wireless communication. In some aspects, a wireless communication device may transfer to a suppress mode based at least in part on determining that a condition associated with the suppress mode is satisfied. In some aspects, the wireless communication device may suppress, during the suppress mode, generation of a notification by a modem of the wireless communication device that is to provide network status information to a particular processor of the wireless communication device. Numerous other aspects are provided.

30 Claims, 11 Drawing Sheets

(56) References Cited

U.S. PATENT DOCUMENTS

| | | | |
|---|---|---|---|
| 2013/0219332 A1* | 8/2013 | Woley | G06F 1/3209 715/808 |
| 2013/0244636 A1* | 9/2013 | Shukla | H04W 4/00 455/418 |
| 2014/0171087 A1* | 6/2014 | Murari | H04W 52/0254 455/437 |
| 2015/0057052 A1 | 2/2015 | Eo et al. | |
| 2015/0089268 A1 | 3/2015 | Park et al. | |

* cited by examiner

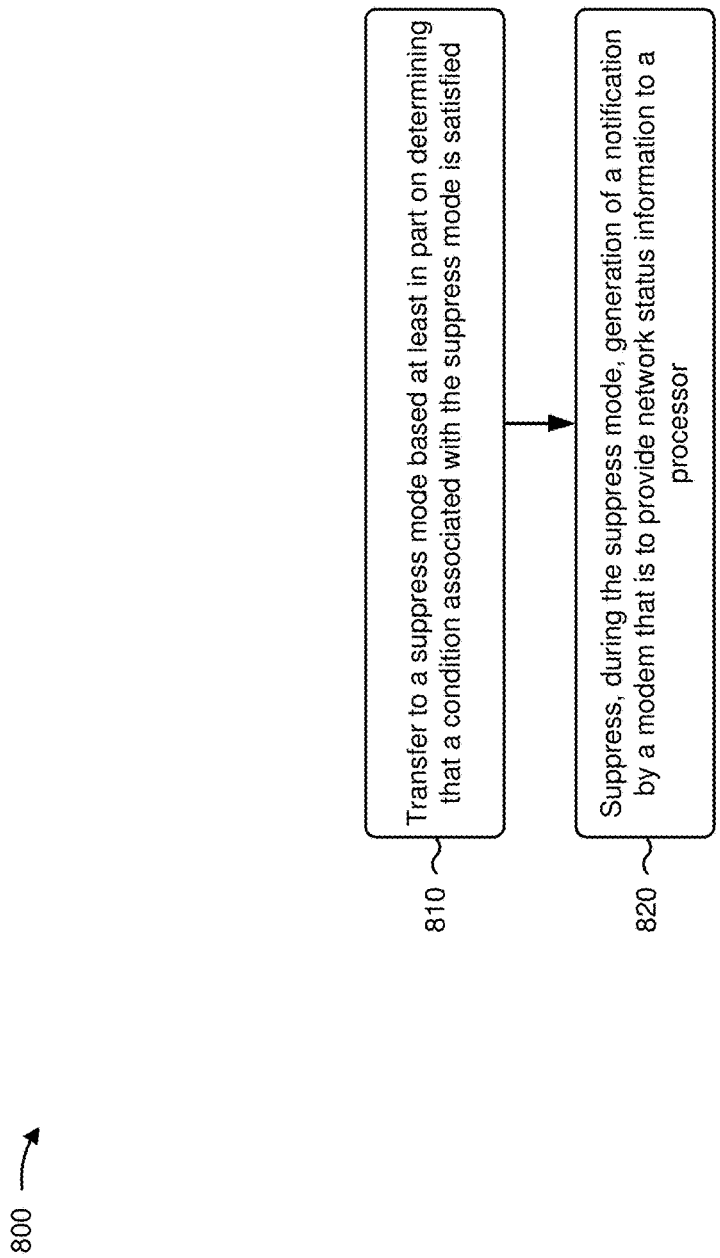

TECHNIQUES AND APPARATUSES FOR SUPPRESSING NETWORK STATUS INFORMATION NOTIFICATIONS

FIELD OF THE DISCLOSURE

Aspects of the present disclosure generally relate to wireless communication, and more particularly to techniques and apparatuses for suppressing network status information notifications.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication may include transferring, by a user equipment (UE), to a suppress mode based at least in part on determining that a condition associated with the suppress mode is satisfied. The condition may include at least one of the UE being engaged in a voice call with no data activity during the voice call, a screen of the UE being off during a data call, or the UE being moved at a threshold speed and the screen of the UE being off. The method may include suppressing, by the UE and during the suppress mode, generation of a notification by a modem of the UE that is to provide network status information to a processor of the UE. The network status information may relate to an alteration to a network status.

In some aspects, a wireless communication device may include a memory and one or more processors operatively coupled to the memory. The one or more processors may be configured to transfer to a suppress mode based at least in part on determining that a condition associated with the suppress mode is satisfied. The condition may include at least one of the wireless communication device being engaged in a voice call with no data activity during the voice call, a screen of the wireless communication device being off during a data call, or the wireless communication device being moved at a threshold speed and the screen of the wireless communication device being off. The one or more processors may be configured to suppress, during the suppress mode, generation of a notification by a modem of the wireless communication device that is to provide network status information to a particular processor of the wireless communication device. The network status information may relate to an alteration to a network status.

In some aspects, a non-transitory computer-readable medium may store one or more instructions for wireless communication. The one or more instructions, when executed by one or more processors of a wireless communication device, may cause the one or more processors to transfer to a suppress mode based at least in part on determining that a condition associated with the suppress mode is satisfied. The condition may include at least one of the wireless communication device being engaged in a voice call with no data activity during the voice call, a screen of the wireless communication device being off during a data call, or the wireless communication device being moved at a threshold speed and the screen of the wireless communication device being off. The one or more instructions, when executed by the one or more processors, may cause the one or more processors to suppress, during the suppress mode, generation of a notification by a modem of the wireless communication device that is to provide network status information to a particular processor of the wireless communication device. The network status information may relate to an alteration to a network status.

In some aspects, an apparatus for wireless communication may include means for transferring to a suppress mode based at least in part on determining that a condition associated with the suppress mode is satisfied. The condition may include at least one of the apparatus being engaged in a voice call with no data activity during the voice call, a screen of the apparatus being off during a data call, or the apparatus being moved at a threshold speed and the screen of the apparatus being off. The apparatus may include means for suppressing, during the suppress mode, generation of a notification by a modem of the apparatus that is to provide network status information to a processor of the apparatus. The network status information may relate to an alteration to a network status.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a wireless communication device, in accordance with various aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1x radio transmission technology (1xRTT), CDMA2000 1x, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Figure 1:
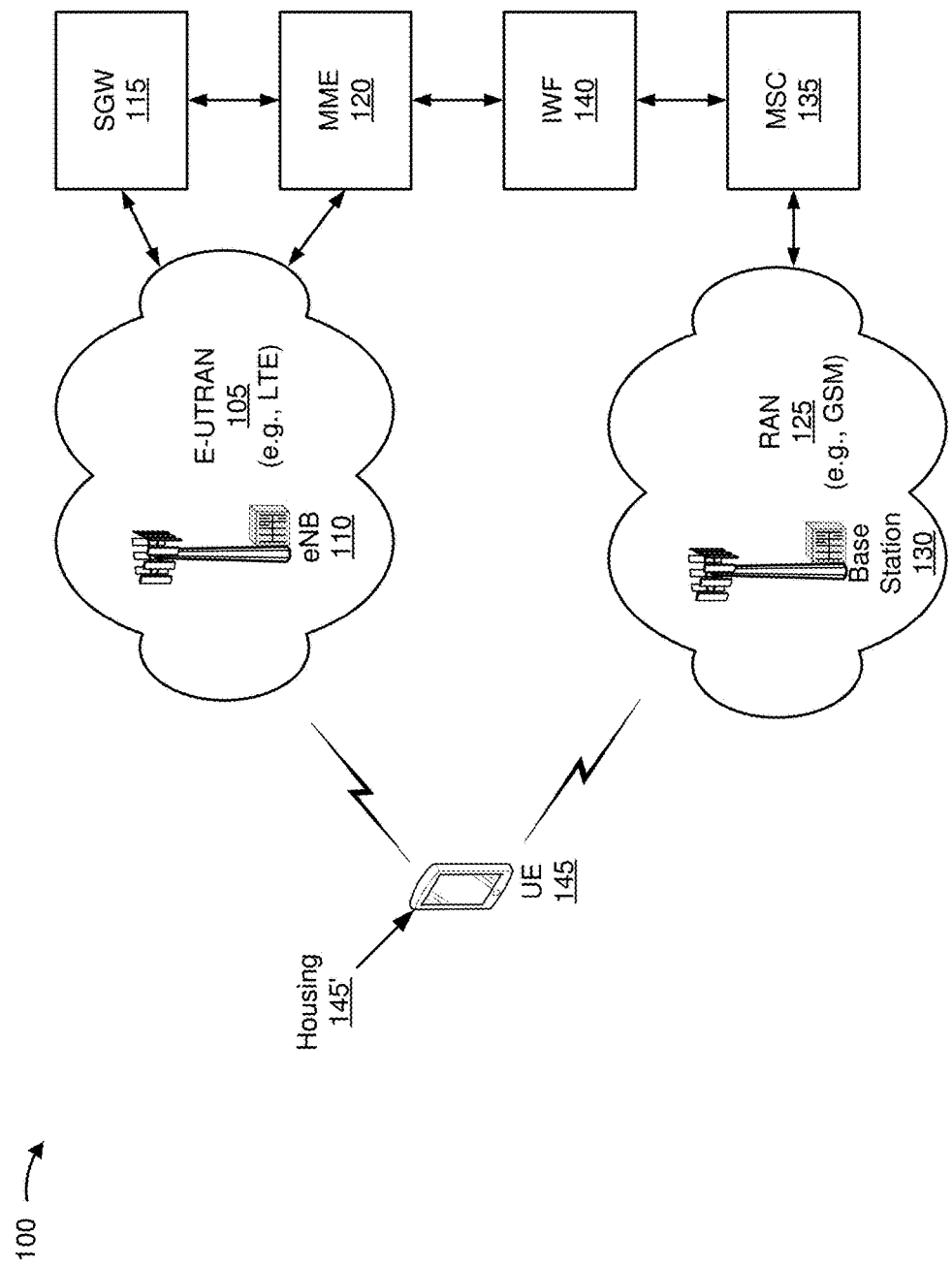
FIG. 1 is a diagram illustrating an example deployment in which multiple wireless networks have overlapping coverage, in accordance with various aspects of the present disclosure.

FIG. 1 is a diagram illustrating an example deployment 100 in which multiple wireless networks have overlapping coverage, in accordance with various aspects of the present disclosure. However, wireless networks may not have overlapping coverage in aspects. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like. UE 145 may be included inside a housing 145' that houses components of UE 145, such as processor components, memory components, and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

UE 145 may transfer from a first cell to a second cell, from a first RAT to a second RAT, and/or the like when operating in a location with poor cell coverage, when operating at a cell edge, when traveling at a threshold speed (e.g., in an automobile, train, airplane, etc.), and/or the like. When UE 145 performs the transfer, a modem of UE 145 may generate a notification to provide network status information to a processor of UE 145, such as an application processor and/or the like. The notification may include information identifying an inter-RAT handover (e.g., a handover from an LTE RAT to a WCDMA or GSM RAT), a change to a set of RATs included in a set of available technologies, a change to a subscription of a multi-subscriber identity module (multi-SIM) UE 145, and/or the like. When the processor of UE 145 is in a low power mode, transferring the notification from the modem to the processor may cause the processor to transfer from the low power mode to an active mode.

This may result in excessive utilization of power resources of UE 145. Moreover, some of the notifications may be unnecessary when the UE 145 satisfies a condition, such as being engaged in a voice call but with no data activity during the voice call, having a screen of UE 145 off during a data call, or being moved at a threshold speed with the screen of UE 145 being off. UE 145 may transfer to a suppress mode when a condition is satisfied and may suppress, during the suppress mode, generation of the notification to provide network status information. In this case, UE 145 may avoid causing the processor to transfer to an active mode. In this way, UE 145 reduces a utilization of power resources relative to generating the notification and providing the notification to the processor.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
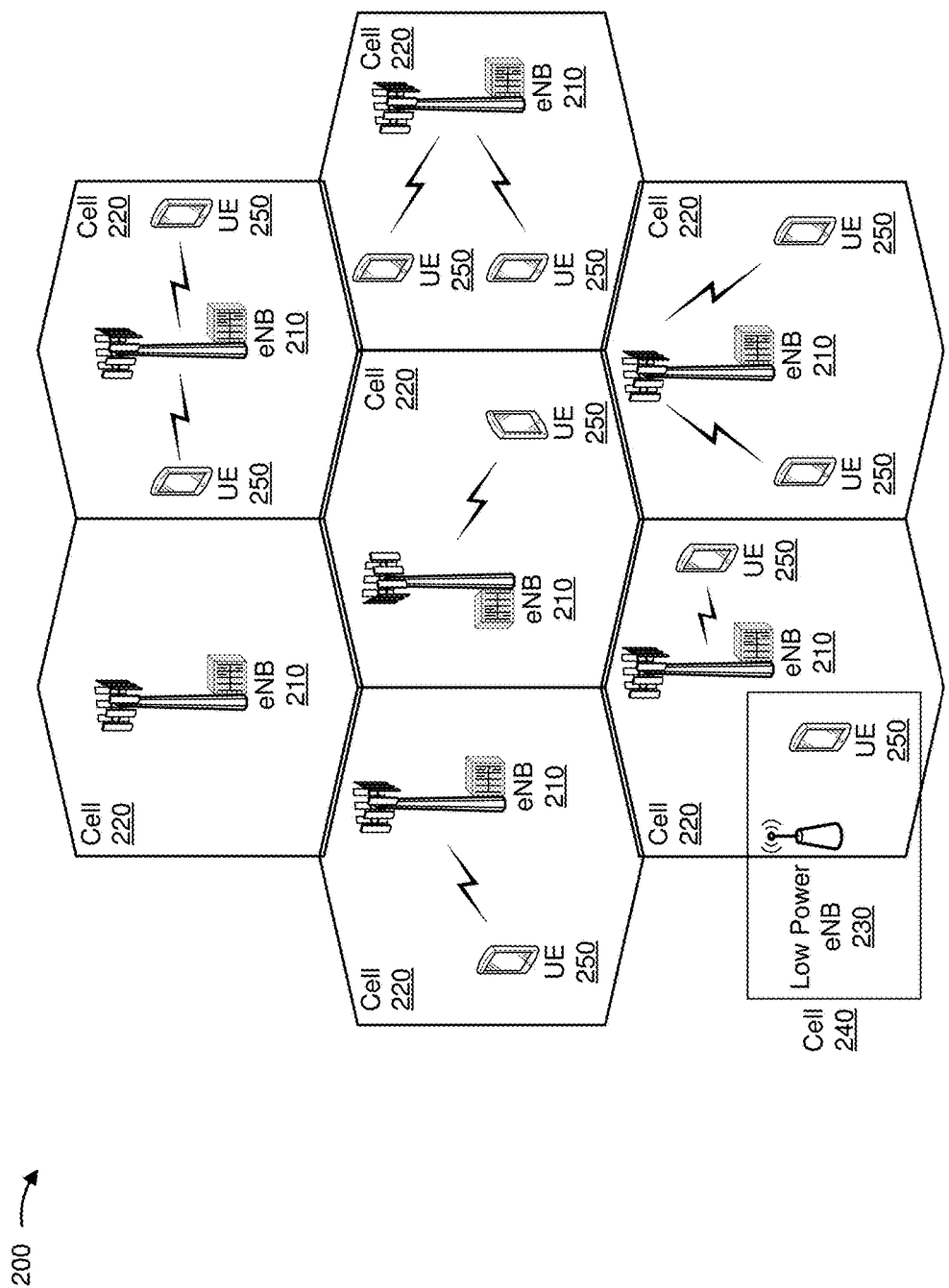
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

A UE 145, 250 operating in a cell 220 may determine that a condition associated with a suppressed mode is satisfied. For example UE 145, 250 may determine that UE 145, 250 is engaged in a voice call with no data activity during the voice call; that a screen of UE 145, 250 is off during a data call; that UE 145, 250 is being moved at a threshold speed and the screen of UE 145, 250 is off; and/or the like. UE 145, 250 may transfer to a suppress mode based at least in part on determining that the condition associated with the suppress mode is satisfied. The suppress mode may refer to a mode where notifications regarding a status of a network (e.g., access network 200) that are to be generated by a modem processor of UE 145, 250 and are to be provided to an application processor of UE 145, 250 are suppressed from being generated and/or provided.

UE 145, 250 may detect an alteration to a network status that is to trigger generation of a notification regarding the network status. For example, during the suppress mode and at an edge of cell 220, UE 145, 250 may detect a change to a set of available non-preferred technologies, which may trigger a modem of UE 145, 250 to generate a notification regarding an altered set of available technologies. UE 145, 250 may suppress, during the suppress mode, generation of the notification by the modem of UE 145, 250. Additionally, or alternatively, UE 145, 250 may suppress a transfer of the notification from the modem to a processor of UE 145, 250. In this way, UE 145, 250 may reduce a utilization of power resources relative to generating the notification and providing the notification to the processor for processing.

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
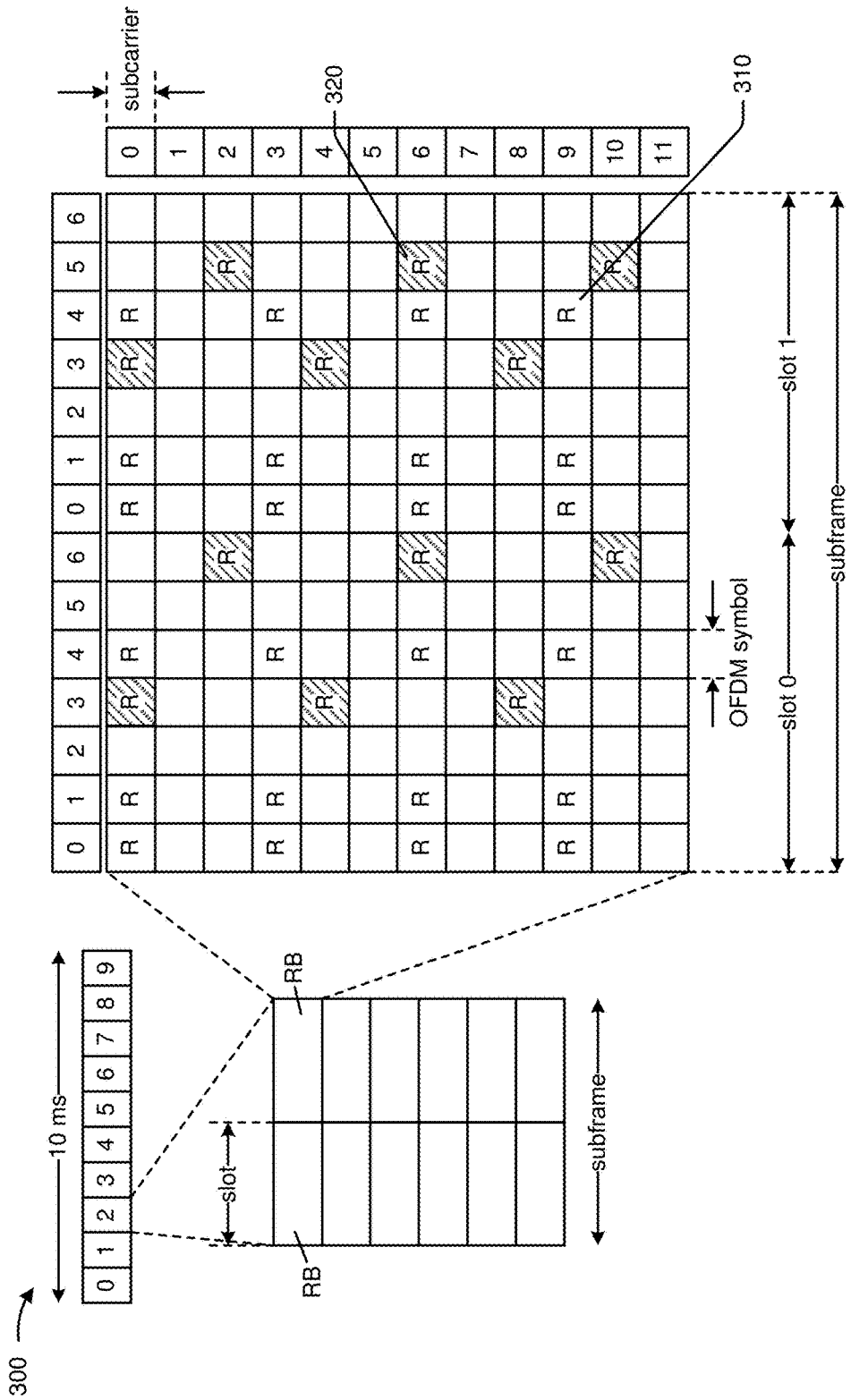
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

UE 145, 250 may receive information from eNB 110, 210, 230 via a DL frame as described herein. For example, UE 145, 250 may engage in a voice call and may receive information associated with the voice call via the DL frame. Additionally, or alternatively, UE 145, 250 may engage in data activity and may receive data associated with the data activity via the DL frame. Additionally, or alternatively, UE 145, 250 may receive information via a DL frame identifying an alteration to a network status. For example, UE 145, 250 may receive information identifying a technology change, a RAT change (e.g., an inter-RAT change or an intra-RAT change), a preferred technology change, a non-preferred technology change, a change to a current dedicated data subscription (DDS) (e.g., a technology change or a system status change), a change to a non-DDS subscription (e.g., a technology change or a system status change), and/or the like.

A technology change may refer to a change within a particular technology family, such as a change from an LTE RAT to a WCDMA/GSM RAT within a 3GPP technology family A preferred technology change may refer to a change to a RAT value in a technology list to a preferred technology in the technology list. For example, in a technology list of "3GPP2, 3GPP2_HRPD (High Rate Packet Data), HDR (High Data Rate)_REVO_DPA (Default Packet Application)," a change to "3GPP2" may be a preferred technology change. Similarly, a non-preferred technology change may include a change from "3GPP2, 3GPP2_HRPD, HDR_REVO_DPA" to "3GPP2 1×, 1×_IS2000_REL_A," where "3GPP2_HRPD" and "HDR_REVO_DPA" are non-preferred technologies of the technology list.

UE 145, 250 may suppress, in a suppress mode, generation of a notification regarding an alteration to the network status, such as a notification identifying a non-preferred technology change, a non-DDS subscription change, and/or the like. In this way, UE 145, 250 reduces a power consumption relative to generating the notification and providing the notification to a processor for processing.

As indicated above, FIG. 3 is provided as an example. Other examples are possible and may differ from what was described above in connection with FIG. 3.

Figure 4:
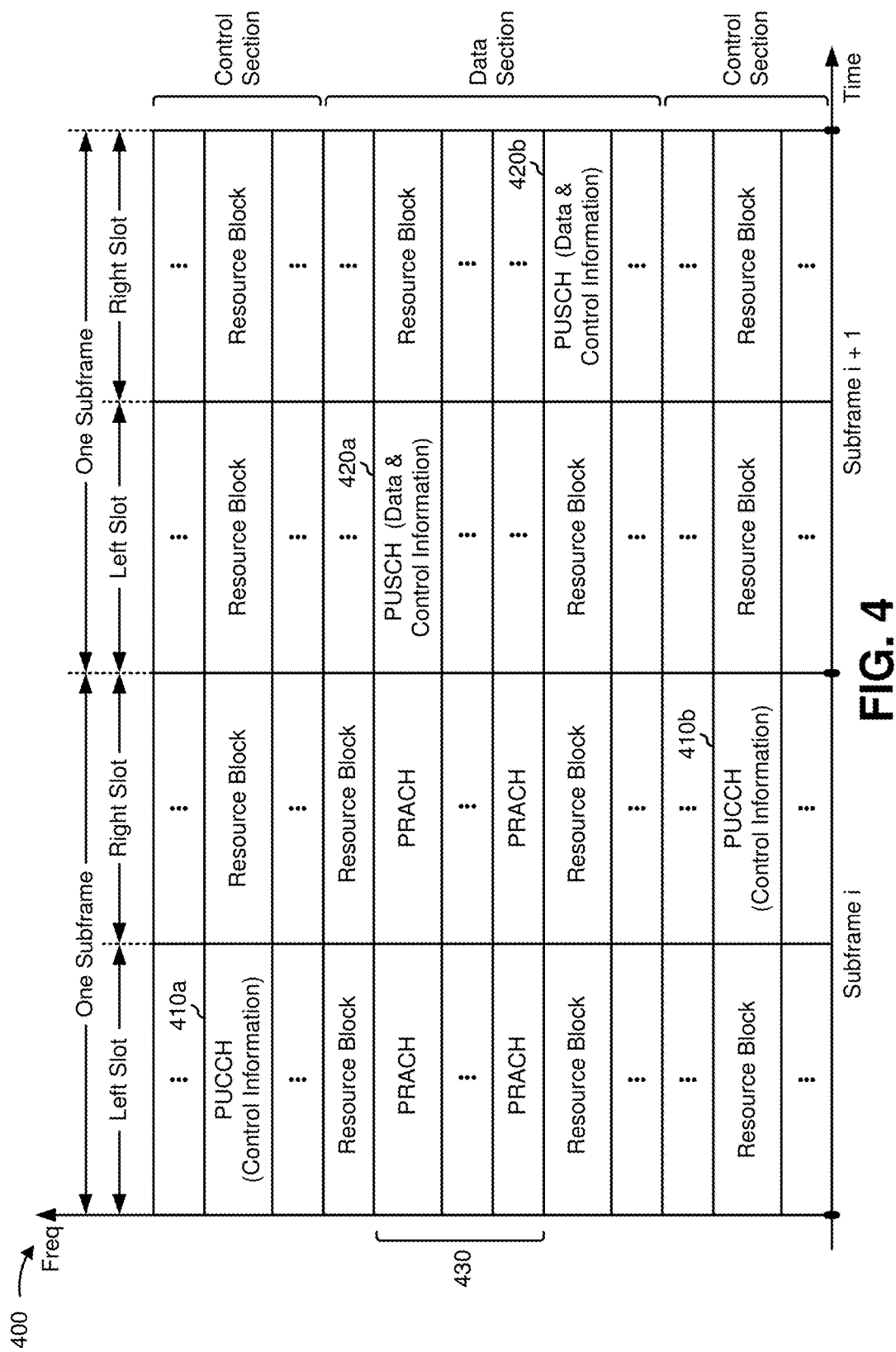
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB.

The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

UE 145, 250 may transmit one or more signals via a UL frame, as described herein. For example, UE 145, 250 may engage in a voice call, and may transmit information associated with a voice call via a set of UL frames. Additionally, or alternatively, UE 145, 250 may engage in data activity, and may transmit data associated with the data activity via a set of UL frames. UE 145, 250 may transfer to a suppress mode to suppress generation of a notification to provide network status information based at least in part on, for example, transmitting information associated with a voice call and not transmitting data associated with data activity. Additionally, or alternatively, UE 145, 250 may transfer to the suppress mode when UE 145, 250 is transmitting data and a screen of UE 145, 250 is off. In another example, UE 145, 250 may transfer to the suppress mode when UE 145, 250 is being moved at a threshold speed and the screen of UE 145, 250 is off. Based at least in part on transferring to the suppress mode, UE 145, 250 may suppress generation of the notification regarding an alteration to the network status. In this way, UE 145, 250 reduces a utilization of power resources relative to generating the notification to provide network status information.

As indicated above, FIG. 4 is provided as an example. Other examples are possible and may differ from what was described above in connection with FIG. 4.

Figure 5:
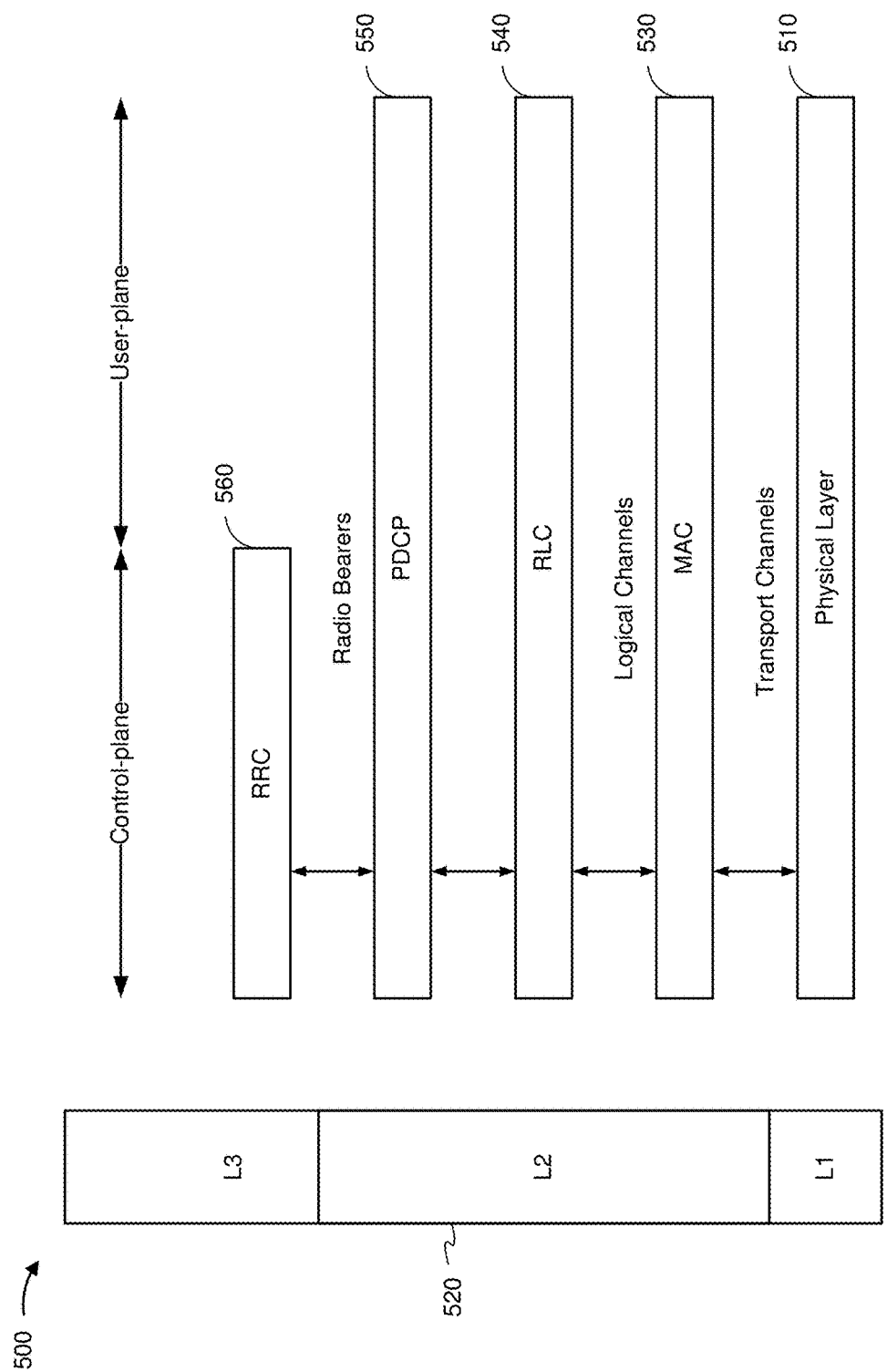
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., a far end UE, a server, and/or the like).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
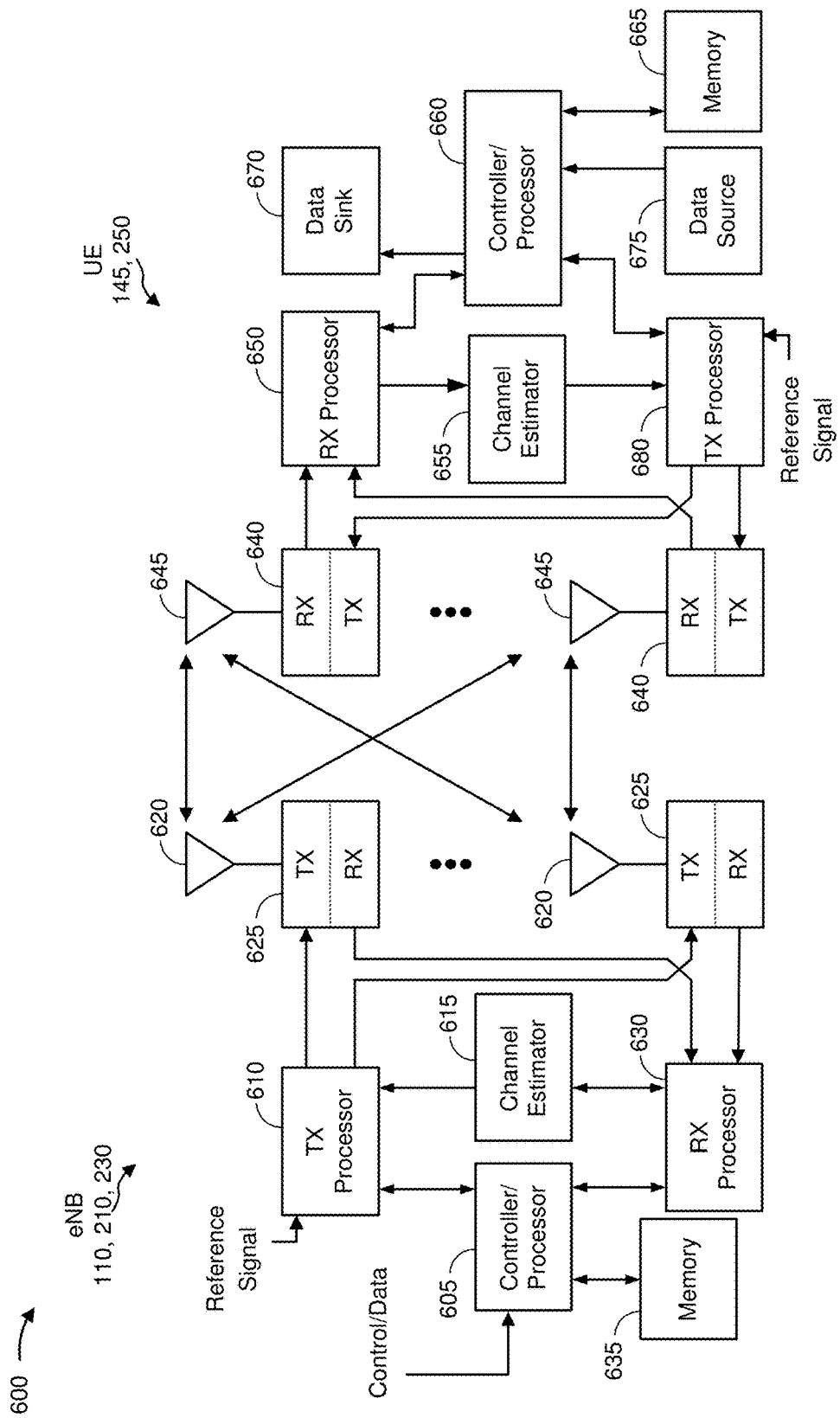
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates an RF carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmission of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the control/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

In some aspects, one or more components of UE 145, 250 may be included in a housing 145', as shown in FIG. 1, such as a memory, one or more processors, a screen (i.e., a display), an antenna, and/or the like. One or more components of UE 145, 250 may be configured to suppress, during a suppress mode, generation of a notification by a modem of UE 145, 250 that is to provide network status information to a processor of UE 145, 250, as described in more detail elsewhere herein. For example, the controller/processor 660 and/or other processors and modules of UE 145, 250 may perform or direct operations of, for example, process 800 of FIG. 8 and/or other processes as described herein. In some aspects, one or more of the components shown in FIG. 6 may be employed to perform example process 800 and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

As described in more detail below, a wireless communication device, which may correspond to UE 145, 250, may transfer to a suppress mode based at least in part on determining that a condition associated with the suppress mode (e.g., the wireless communication device being engaged in a voice call with no data activity during the voice call, a screen of the wireless communication device being off during a data call, the wireless communication device being moved at a threshold speed and the screen of the wireless communication device being off, and/or the like) is satisfied. The wireless communication device may suppress, during the suppress mode, generation of a notification by a modem of the wireless communication device that is to provide network status information (e.g., information relating to an alteration to a network status) to a processor of the wireless communication device. In this way, UE 145, 250 may reduce utilization of power resources relative to generating the notification when the condition is satisfied.

Figure 7A:
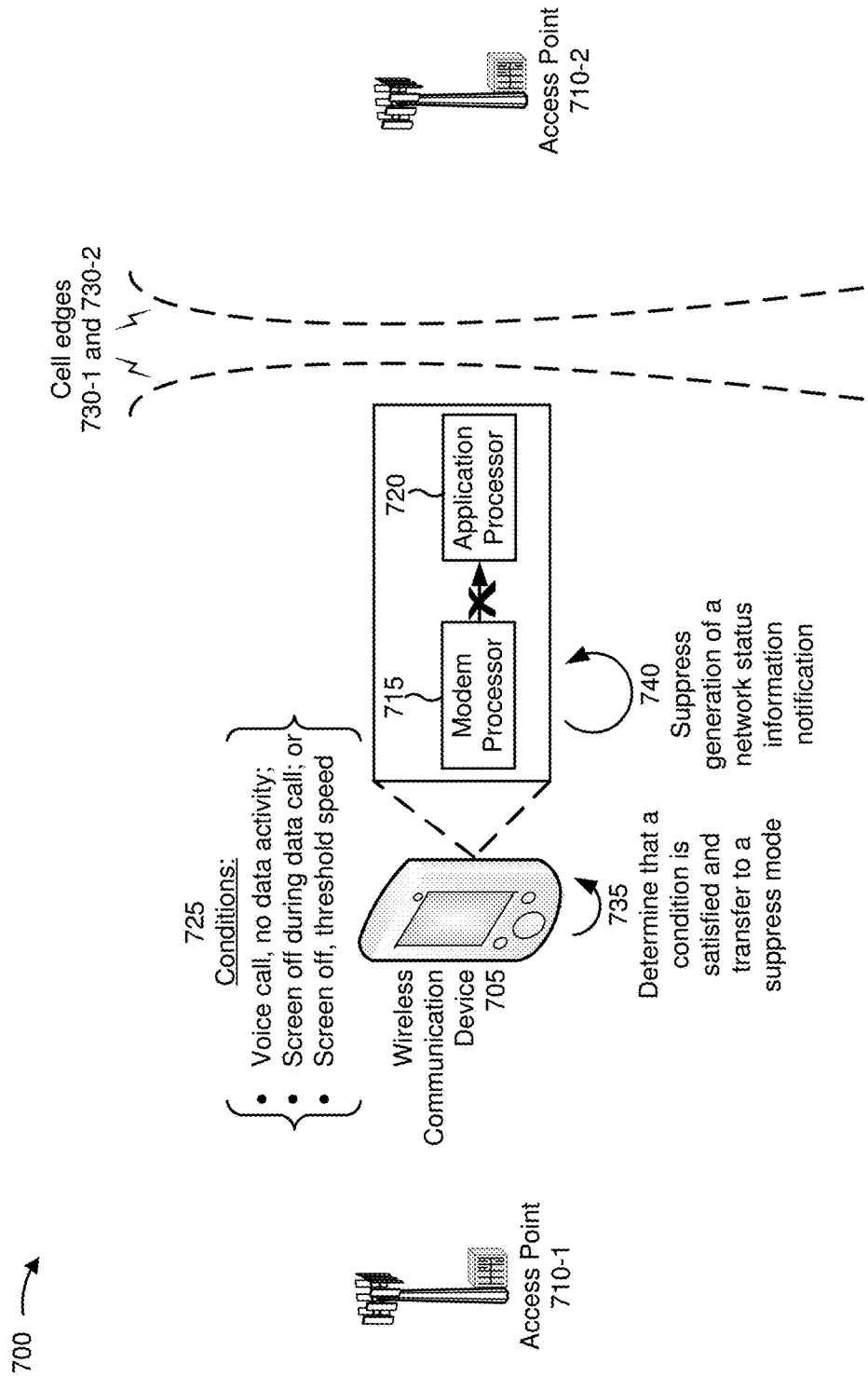
FIGS. 7A and 7B are diagrams illustrating an example of suppressing network status information notifications, in accordance with various aspects of the present disclosure.
Figure 7B:
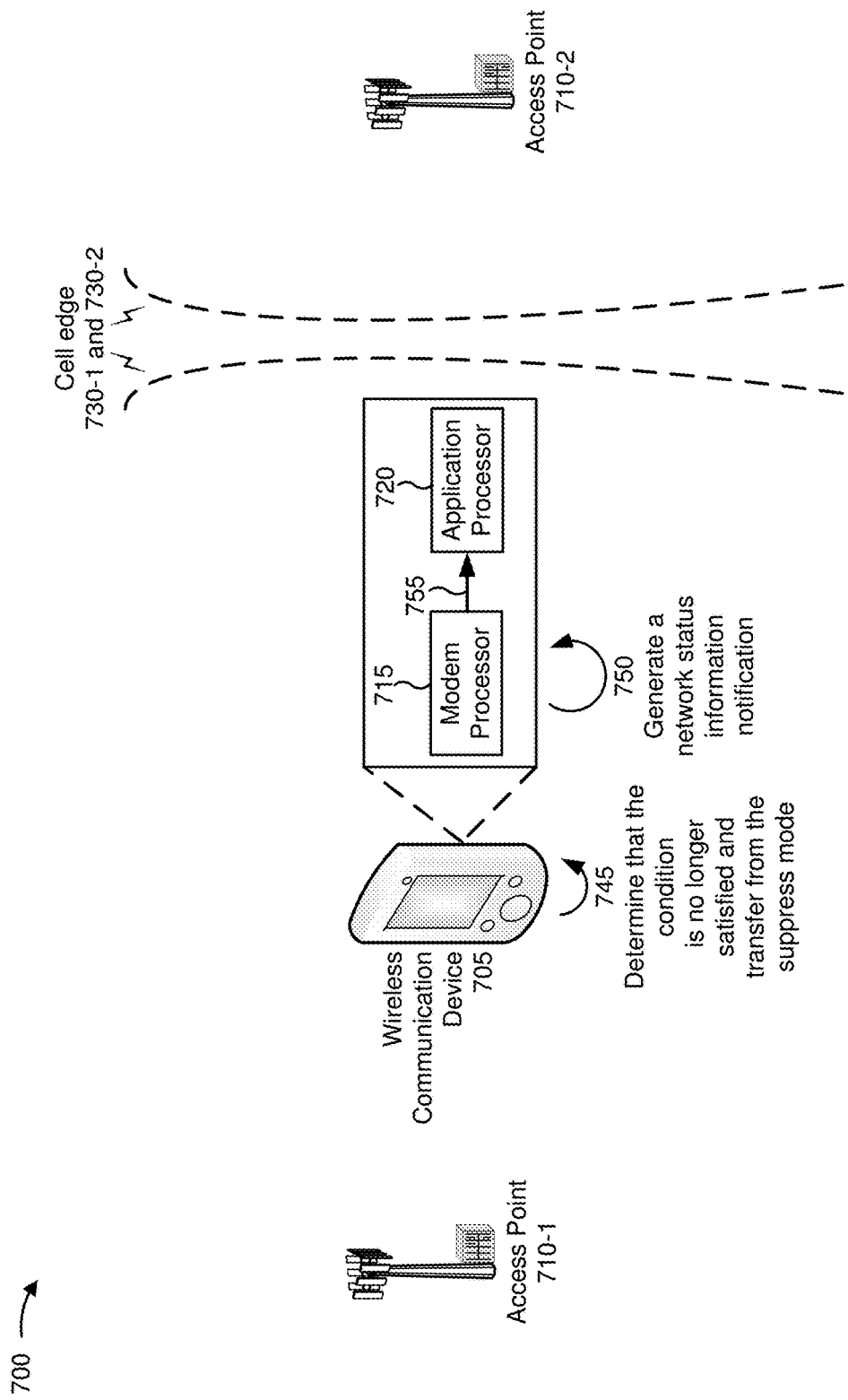

FIGS. 7A and 7B are diagrams illustrating an example 700 of suppressing network status information notifications, in accordance with various aspects of the present disclosure.

As shown in FIG. 7A, example 700 may include a wireless communication device 705 (e.g., a UE, such as UE 145, 250) and a set of access points 710-1 and 710-2 (e.g., a set of eNBs, such as eNB 110, 210, 230). Wireless communication device 705 may include a modem processor 715 and an application processor 720. In some aspects, application processor 720 may be operating in a low power state. For example, application processor 720 may operate in a first state where application processor 720 is not processing information and is associated with a reduced power consumption relative to a second state where application processor 720 is processing information. Wireless communication device 705 may be configured to detect a set of conditions 725, such as being engaged in a voice call with no data activity during the voice call, a screen of wireless communication device 705 being off during a data call, a screen of wireless communication device 705 being off and wireless communication device 705 traveling at a threshold speed, and/or the like. Access points 710-1 and 710-2 may be associated with respective cells 730, indicated by cell edge 730-1 and cell edge 730-2. Wireless communication device 705 may operate within a threshold proximity of cell edge 730-1 and cell edge 730-2.

As further shown in FIG. 7A, and by reference number 735, wireless communication device 705 may determine that a condition, of the conditions 725, is satisfied and may transfer to a suppress mode. For example, wireless communication device 705 may determine that wireless communication device 705 is engaging in a voice call and is not transmitting data associated with data activity. Additionally, or alternatively, wireless communication device 705 may determine that a screen (i.e., a display) of wireless communication device 705 is off during a data call. Additionally, or alternatively, wireless communication device 705 may determine that the screen of wireless communication device 705 is off and that wireless communication device 705 is traveling at a threshold speed (i.e., at a speed that satisfies a threshold, such as being equal to the threshold, greater than the threshold, and/or the like). These are examples of conditions 725 and, in some aspects, different conditions are possible. In some aspects, wireless communication device 705 may cause modem processor 715 to enter the suppress mode by providing a message to modem processor 715.

In some aspects, wireless communication device 705 may determine that wireless communication device 705 is traveling at the threshold speed based at least in part on location information (e.g., a set of GPS coordinates), a determined Doppler effect relating to signals being transmitted and/or received by wireless communication device 705, and/or the like. In some aspects, wireless communication device 705 may monitor a modem of wireless communication device 705 to determine whether wireless communication device 705 is engaged in a voice call, is associated with data activity, is performing a data call, and/or the like. In some aspects, wireless communication device 705 may monitor a display component of wireless communication device 705 to determine whether a screen of wireless communication device 705 is off.

In another example, wireless communication device 705 may determine that another type of condition is satisfied and may transfer to the suppress mode. For example, wireless communication device 705 may determine that a screen of wireless communication device 705 is off and that wireless communication device 705 is not engaging in a voice call.

Although implementations, described herein, include wireless communication device 705 performing functions, such as determining that the condition is satisfied, determining that a speed threshold is satisfied, determining a Doppler effect, and/or the like, implementations, described herein, may be performed by a component of wireless communication device 705, such as modem processor 715, application processor 720, or another similar component, such as additional circuitry, low power circuitry, and/or the like.

As further shown in FIG. 7A, and by reference number 740, wireless communication device 705 may suppress generation of a notification to convey network status information. For example, modem processor 715 of wireless communication device 705 may suppress generation of the notification to convey the network status information based at least in part on wireless communication device 705 having transferred to the suppress mode. In some aspects, a monitoring component (e.g., of modem processor 715) may monitor for a condition that causes generation of the notification, and may suppress generation of the notification based on the monitoring component being caused to enter the suppress mode.

In some aspects, wireless communication device 705 may suppress generation of the notification based at least in part on detecting an alteration to a network status. For example, wireless communication device 705 may detect the alteration, such as a RAT change, a non-preferred technology change, and/or the like, and may suppress a notification to convey information identifying the alteration to application processor 720. Additionally, or alternatively, when wireless communication device 705 is a multi-SIM device, wireless communication device 705 may detect a change to a non-DDS subscription (e.g., a non-DDS technology change or a non-DDS system status change), and may suppress a notification to convey information identifying the non-DDS subscription change.

In another example, wireless communication device 705 may suppress generation of a notification to convey another type of alteration to a network status. For example, wireless communication device 705 may suppress a notification relating to a transfer from a first RAT of a first cell to a second RAT of a second cell where the first RAT and the second RAT share a common technology mode family, such as a transfer between a WCDMA, a HSDPA, an HSDPA+, and/or a DC_HSDPA+ RAT. In some aspects, wireless communication device 705 may suppress transfer of the notification when suppressing generation of the notification. For example, modem processor 715 may be triggered to generate the notification, and wireless communication device 705 may suppress transfer of the notification to application processor 720, thereby avoiding application processor 720 transferring from a low power state to another state and utilizing power resources to process the notification and, thus, conserving power of wireless communication device 705.

In some aspects, wireless communication device 705 may store information identifying the network status when in the suppress mode. For example, wireless communication device 705 may store information indicating the status of the network, and may subsequently provide a notification of the status of the network based at least in part on stored information after transferring from the suppress mode. In this way, wireless communication device 705 ensures that application processor 720 receives information identifying the status of the network when wireless communication device 705 transfers from the suppress mode and, for example, application processor 720 transfers from a low power state to another state.

In some aspects, wireless communication device 705 may permit generation and transfer of a notification to convey another type of network status information regarding an alteration to a network status when in the suppress mode. For example, when a change to a network status relates to an inter-RAT change, a preferred technology change, a current DDS subscription change, and/or the like, modem processor 715 may generate a notification regarding the change to the network status, and may transfer the notification to application processor 720 when in the suppress mode. In this way, wireless communication device 705 avoids suppressing notifications that may impact operation of application processor 720 and/or an application of wireless communication device 705.

As shown in FIG. 7B, and by reference number 745, wireless communication device 705 may determine that the condition is no longer satisfied and may transfer from the suppress mode. For example, wireless communication device 705 may determine that the particular condition 725, that was satisfied to cause wireless communication device 705 to enter the suppress mode, is no longer satisfied (e.g., a screen of wireless communication device 705 has been turned on, wireless communication device 705 is no longer traveling at the threshold speed, and/or the like). In this case, wireless communication device 705 may transfer from the suppress mode to another mode, such as an active mode. As shown by reference number 750, wireless communication device 705 may generate a notification to convey network status information from modem processor 715 to application processor 720. For example, modem processor 715 may generate the notification and may, as shown by reference number 755, transfer the notification to application processor 720 to identify a status of the network to application processor 720 and/or one or more applications of wireless communication device 705.

As indicated above, FIGS. 7A and 7B are provided as an example. Other examples are possible and may differ from what was described with respect to FIGS. 7A and 7B.

FIG. 8 is a diagram illustrating an example process 800 performed, for example, by a wireless communication device, in accordance with various aspects of the present disclosure. Example process 800 is an example where a wireless communication device (e.g., UE 145, 250, wireless communication device 705, the apparatus 902 of FIG. 9, the apparatus 902' of FIG. 10, and/or the like) suppresses network status information notifications.

As shown in FIG. 8, in some aspects, process 800 may include transferring to a suppress mode based at least in part on determining that a condition associated with the suppress mode is satisfied (block 810). For example, the wireless communication device may transfer to the suppress mode based at least in part on determining that the condition associated with the suppress mode is satisfied. In some aspects, the condition may include the wireless communication device being engaged in a voice call with no data activity during the voice call, a screen of the wireless communication device being off during a data call, the wireless communication device being moved at a threshold speed (i.e., at a speed that satisfies a threshold, such as being equal to the threshold, greater than the threshold, and/or the like) and the screen of the wireless communication device being off, and/or the like.

In some aspects, the wireless communication device transfers to the suppress mode based at least in part on the wireless communication device being engaged in a voice call with no data activity during the voice call. In some aspects, the wireless communication device transfers to the suppress mode based at least in part on the screen of the wireless communication device being off during a data call. In some aspects, the wireless communication device transfers to the suppress mode based at least in part on the wireless communication device being moved at a threshold speed (i.e., at a speed that satisfies a threshold, such as being equal to the threshold, greater than the threshold, and/or the like) and the screen of the wireless communication device being off.

As shown in FIG. 8, in some aspects, process 800 may include suppressing, during the suppress mode, generation of a notification by a modem that is to provide network status information to a processor (block 820). For example, the wireless communication device may suppress, during the suppress mode, generation of a notification by a modem of the wireless communication device that is to provide network status information to a processor of the wireless communication device. In some aspects, the network status information may relate to an alteration to a network status.

In some aspects, the wireless communication device may generate, during the suppress mode, a particular notification to provide network status information regarding a particular alteration to the network status, and may provide, during the suppress mode, the particular notification to the processor of the wireless communication device. In some aspects, the particular alteration may relate to a technology change, a preferred technology change, a change to a current dedicated data subscription (DDS), and/or the like.

In some aspects, the processor of the wireless communication device may be in a low power state during the suppress mode. In some aspects, the network status information may relate to a radio access technology (RAT) change, a non-preferred technology change, a non-dedicated data subscription (DDS) change, and/or the like.

In some aspects, the wireless communication device may transfer out of the suppress mode, and may generate a particular notification by the modem of the wireless communication device to provide current network status information to the processor of the wireless communication device based at least in part on transferring out of the suppress mode.

Although FIG. 8 shows example blocks of process 800, in some aspects, process 800 may include additional blocks, fewer blocks, different blocks, or differently arranged blocks than those depicted in FIG. 800. Additionally, or alternatively, two or more of the blocks of process 800 may be performed in parallel.

Figure 9:
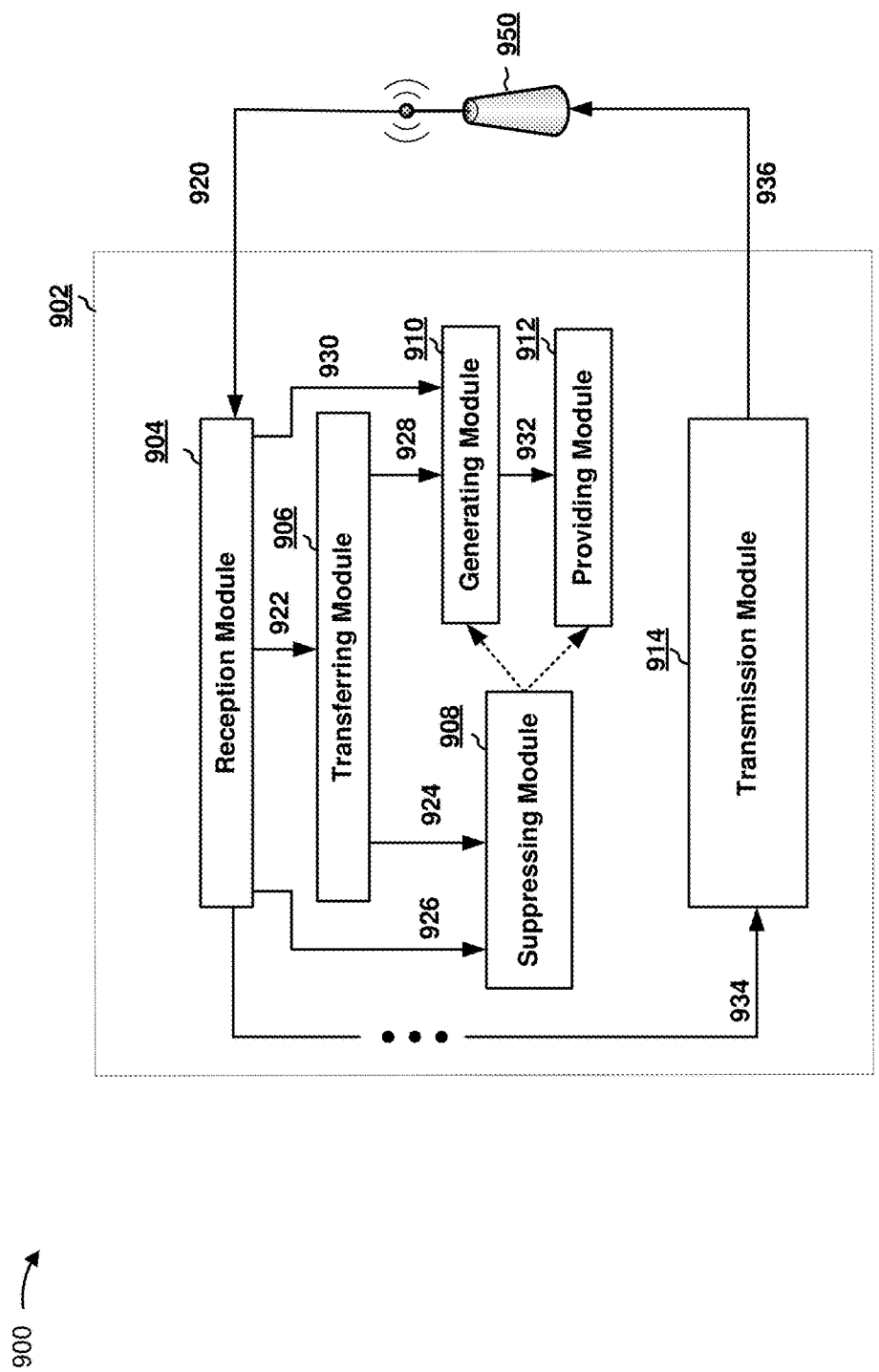
FIG. 9 is a conceptual data flow diagram illustrating the data flow between different modules/means/components in an example apparatus.

FIG. 9 is a conceptual data flow diagram 9 illustrating the data flow between different modules/means/components in an example apparatus 902. The apparatus 902 may be a UE. In some aspects, the apparatus 902 includes a reception module 904, a transferring module 906, a suppressing module 908, a generating module 910, a providing module 912, and/or a transmission module 914. In some aspects, modules 904 through 914 and/or other modules may be software components, hardware components, a combination of software components and firmware components, and/or the like.

For example, a UE may implement modules 904 through 914 and/or other modules as software components of a processing system, such as a modem processor 715 of wireless communication device 705, an application processor 720 of wireless communication device 705, an RX processor 650 of UE 145, 250, a TX processor 680 of UE 145, 250, a controller/processor 660 of UE 145, 250, and/or the like. Additionally, or alternatively, modules 904 through 914 may be implemented in other ways than as described herein.

The reception module 904 may receive, from a base station 950 and as data 920, data associated with a voice call, a data call, and/or the like. In some aspects, the reception module 904 may receive a signaling message that may permit apparatus 902 to determine that apparatus 902 is traveling at a speed that satisfies a threshold. For example, the reception module 904 may receive a positioning signal to determine a change in position and/or another type of signal to calculate a Doppler effect, and may determine a speed based at least in part on determining the change in position and/or the Doppler effect. In some aspects, the reception module 904 may receive data identifying a change to a status of a network, such as data indicating an inter-RAT change, an intra-RAT change, a preferred technology change, a non-preferred technology change, a subscription change (e.g., a DDS subscription or a non-DDS subscription change), and/or the like.

The transferring module 906 may receive, from reception module 904 and as data 922, information indicating that apparatus 902 is to transfer to a suppress mode. For example, the transferring module 908 may receive information relating to a condition associated with the suppress mode, such as the apparatus 902 being engaged in a voice call with no data activity during the voice call, a screen of the apparatus 902 being off during a data call, the apparatus 902 being moved at a threshold speed and the screen of the apparatus 902 is off, and/or the like. The transferring module 908 may transfer the apparatus 902 to the suppress mode based at least in part on determining that the condition associated with the suppress mode is satisfied. In some aspects, the transferring module 908 may transfer the apparatus 902 out of the suppress mode, such as based at least in part on determining that a condition associated with the suppress mode is not satisfied.

The suppressing module 908 may receive, from transferring module 906 and as data 924, information indicating that the apparatus 902 is in a suppress mode; and may receive, from reception module 904, and as data 926, information indicating an alteration to a network status. In this case, based at least in part on apparatus 902 being in the suppress mode, the suppressing module 906 may suppress generation of a notification by a modem of the apparatus 902 that is to provide network status information to a process of the apparatus 902.

The generating module 910 may receive, from transferring module 906 and as data 928, information indicating that the apparatus 902 has transferred out of the suppress mode; and may receive, from reception module 904, and as data 930, information indicating an alteration to a network status. In this case, the generating module 910 (e.g., a modem of the apparatus 902) may generate a particular notification to provide network status information to a processor of the apparatus 902 based at least in part on transferring out of the suppress mode. In some aspects, generating module 910 may receive data 928 indicating that the apparatus 902 has transferred into the suppress mode. In this case, the generating module 910 may generate a particular notification to provide network status information regarding a particular alteration to a network status, such as a preferred technology change, a change to a current DDS subscription, and/or the like. In some aspects, the generating module 910 may receive information from suppressing module 908 that may suppress generation of a notification to convey network status information, such as when apparatus 902 is operating in the suppress mode.

The providing module 912 may receive, from generating module 910 and as data 932, a notification to provide network status information to the processor of the apparatus 902. In this case, providing module 912 may provide the network status information from the modem of the apparatus 902 to the processor of the apparatus 902 for processing. In some aspects, the providing module 912 may receive an indication that network status information is not to be provided to the processor of the apparatus 902, such as from suppressing module 908 during the suppress mode, and the providing module 912 may be suppressed from providing the network status information.

The transmission module 914 may receive, from the reception module 904 and/or one or more intermediate modules, and as data 934, data for transmission. For example, based at least in part on one or more other modules generating data for transmission, such as based at least in part on data 920 received by reception module 904, transmission module 914 may selectively transmit data 936 to base station 950.

The apparatus may include additional modules that perform each of the blocks of the algorithm in the aforementioned flow chart of FIG. 8. As such, each block in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
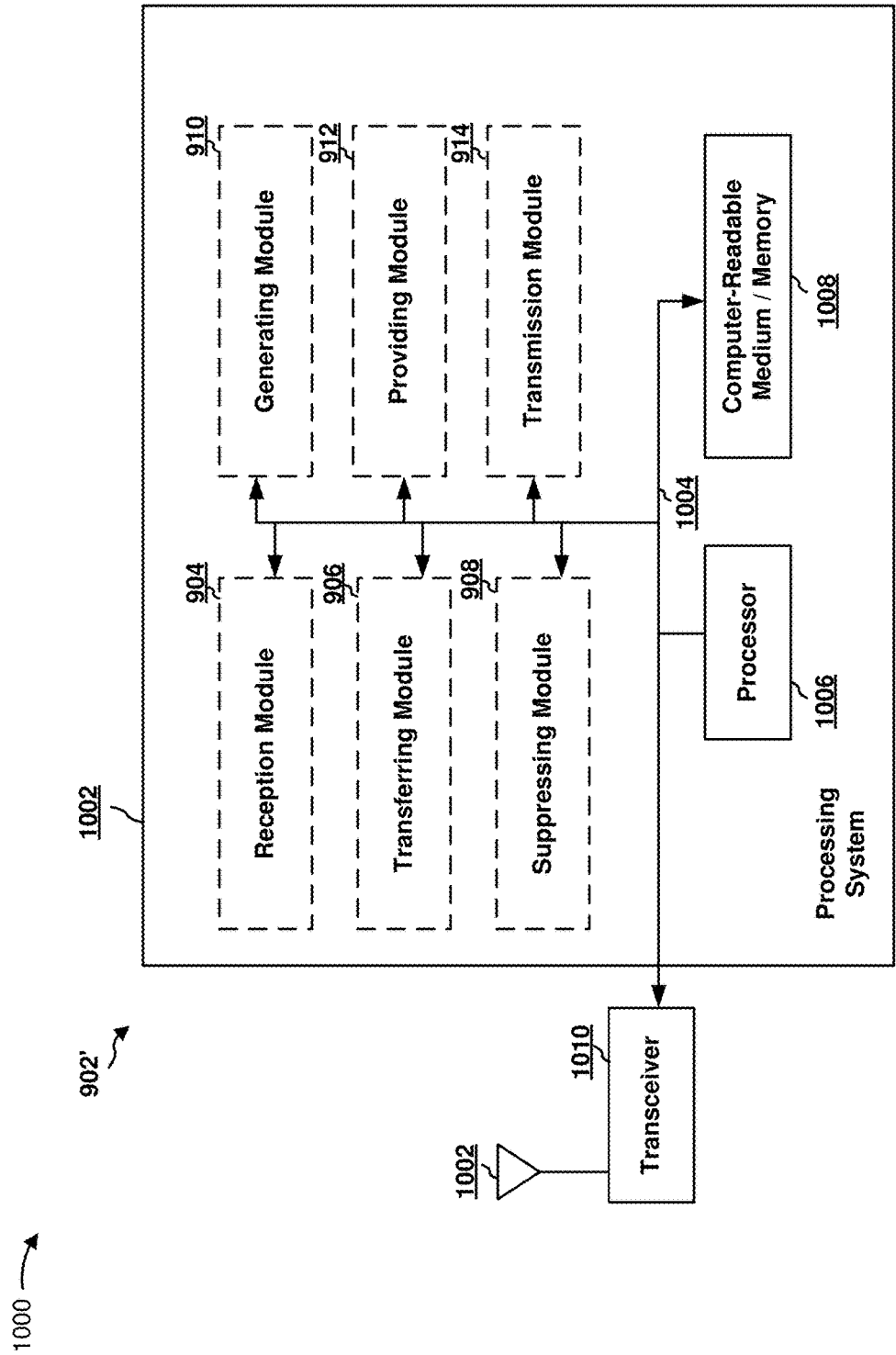
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be a UE.

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the modules 904, 906, 908, 910, 912, and 914 and the computer-readable medium/memory 1008. The bus 1004 may also link various other circuits such as timing sources, peripherals, voltage regulators, and power management circuits, which are well known in the art, and therefore, will not be described any further.

The processing system 1002 may be coupled to a transceiver 1010. The transceiver 1010 is coupled to one or more antennas 1012. The transceiver 1010 provides a means for communicating with various other apparatus over a transmission medium. The transceiver 1010 receives a signal from the one or more antennas 1012, extracts information from the received signal, and provides the extracted information to the processing system 1002, specifically the reception module 904. In addition, the transceiver 1010 receives information from the processing system 1002, specifically the transmission module 914, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described supra for any particular apparatus. The computer-readable medium/memory 1008 may also be used for storing data that is manipulated by the processor 1006 when executing software. The processing system further includes at least one of the modules 904, 906, 908, 910, 912, and 914. The modules may be software modules running in the processor 1006, resident/stored in the computer readable medium/memory 1008, one or more hardware modules coupled to the processor 1006, or some combination thereof. The processing system 1002 may be a component of the UE 145, 250 and may include the memory 665 and/or at least one of the TX processor 680, the RX processor 650, and/or the controller/processor 660.

In some aspects, the apparatus 902/902' for wireless communication includes means for transferring to a suppress mode based at least in part on determining that a condition associated with the suppress mode is satisfied. In some aspects, the apparatus 902/902' includes means for suppressing, during the suppress mode, generation of a notification by a modem of the apparatus 902/902' that is to provide network status information to a processor of the apparatus 902/902'.

In some aspects, the apparatus 902/902' includes means for transferring out of the suppress mode, means for generating a particular notification by the modem of the apparatus to provide current network status information to the processor of the apparatus based at least in part on transferring out of the suppress mode, and means for providing the particular notification from the modem of the apparatus to the processor of the apparatus. In some aspects, the apparatus 902/902' includes means for generating, during the suppress mode, a particular notification to provide network status information regarding a particular alteration to the network status and means for providing, during the suppress mode, the particular notification to the processor of the apparatus.

The aforementioned means may be one or more of the aforementioned modules of the apparatus 902 and/or the processing system 1002 of the apparatus 902' configured to perform the functions recited by the aforementioned means. As described supra, the processing system 1002 may include the TX processor 680, the RX processor 650, and/or the controller/processor 660. As such, in one configuration, the aforementioned means may be the TX processor 680, the RX processor 650, and/or the controller/processor 660 configured to perform the functions recited by the aforementioned means.

FIG. 10 is provided as an example. Other examples are possible and may differ from what was described in connection with FIG. 10.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method for wireless communication, comprising:
transferring, by a user equipment (UE), to a suppress mode based at least in part on determining that a condition associated with the suppress mode is satisfied, wherein the condition includes at least one of:
the UE being engaged in a voice call with no data activity during the voice call,
or
the UE being moved at a threshold speed and a screen of the UE being off;
suppressing, by the UE and during the suppress mode, generation of a notification by a modem of the UE that is to provide network status information to a processor of the UE,
the network status information relating to an alteration to a network status;
generating, by the UE and during the suppress mode, a particular notification to provide network status information regarding a particular alteration to the network status,
wherein the particular alteration relates to at least one of:
a technology change,
a preferred technology change, or
a change to a current dedicated data subscription (DDS); and
providing, by the UE and during the suppress mode, the particular notification to the processor of the UE.

2. The method of claim 1, where the notification is a first notification; and
the method further comprising:
transferring out of the suppress mode;
generating a second notification by the modem of the UE to provide current network status information to the processor of the UE based at least in part on transferring out of the suppress mode; and
providing the second notification from the modem of the UE to the processor of the UE.

3. The method of claim 2, further comprising:
storing the current network status information during the suppress mode.

4. The method of claim 1, wherein the processor of the UE is in a low power state during the suppress mode.

5. The method of claim 1, wherein the network status information relates to at least one of:
a radio access technology (RAT) change,
a non-preferred technology change, or
a non-dedicated data subscription (DDS) change.

6. The method of claim 1, wherein the UE transfers to the suppress mode based at least in part on the UE being engaged in the voice call with no data activity during the voice call.

7. The method of claim 1, wherein the UE transfers to the suppress mode further based at least in part on the screen of the UE being off during a data call.

8. The method of claim 1, wherein the UE transfers to the suppress mode based at least in part on the UE being moved at the threshold speed and the screen of the UE being off.

9. A wireless communication device, comprising:
a memory; and
one or more processors operatively coupled to the memory,
the one or more processors being configured to:
transfer to a suppress mode based at least in part on determining that a condition associated with the suppress mode is satisfied,
wherein the condition includes at least one of:
the wireless communication device being engaged in a voice call with no data activity during the voice call, or
the wireless communication device being moved at a threshold speed and a screen of the wireless communication device being off;
suppress, during the suppress mode, generation of a notification by a modem of the wireless communication device that is to provide network status information to a particular processor of the wireless communication device,
the network status information relating to an alteration to a network status;
generate, during the suppress mode, a particular notification to provide network status information regarding a particular alteration to the network status,
wherein the particular alteration relates to at least one of:
a technology change,
a preferred technology change, or
a change to a current dedicated data subscription (DDS); and
provide, during the suppress mode, the particular notification to the particular processor of the wireless communication device.

10. The wireless communication device of claim 9, wherein the notification is a first notification; and
wherein the one or more processors are further configured to:
transfer out of the suppress mode;
generate a second notification by the modem of the wireless communication device to provide current network status information to the particular processor of the wireless communication device based at least in part on transferring out of the suppress mode; and
provide the second notification from the modem of the wireless communication device to the particular processor of the wireless communication device.

11. The wireless communication device of claim 9, wherein the particular processor of the wireless communication device is in a low power state during the suppress mode.

12. The wireless communication device of claim 9, wherein the network status information relates to at least one of:
a radio access technology (RAT) change,
a non-preferred technology change, or
a non-dedicated data subscription (DDS) change.

13. The wireless communication device of claim 9, wherein the wireless communication device transfers to the suppress mode based at least in part on the wireless communication device being engaged in the voice call with no data activity during the voice call.

14. The wireless communication device of claim 9, wherein the wireless communication device transfers to the suppress mode further based at least in part on the screen of the wireless communication device being off during a data call.

15. The wireless communication device of claim 9, wherein the wireless communication device transfers to the suppress mode based at least in part on the wireless communication device being moved at the threshold speed and the screen of the wireless communication device being off.

16. The wireless communication device of claim 9, further comprising:
a housing to house the memory, the one or more processors, the screen, and an antenna.

17. A non-transitory computer-readable medium storing one or more instructions for wireless communication, the one or more instructions comprising:
one or more instructions that, when executed by one or more processors of a wireless communication device, cause the one or more processors to:

transfer to a suppress mode based at least in part on determining that a condition associated with the suppress mode is satisfied,
wherein the condition includes at least one of:
the wireless communication device being engaged in a voice call with no data activity during the voice call, or
the wireless communication device being moved at a threshold speed and a screen of the wireless communication device being off;
suppress, during the suppress mode, generation of a notification by a modem of the wireless communication device that is to provide network status information to a particular processor of the wireless communication device,
the network status information relating to an alteration to a network status;
generate, during the suppress mode, a particular notification to provide network status information regarding a particular alteration to the network status,
wherein the particular alteration relates to at least one of:
a technology change,
a preferred technology change, or
a change to a current dedicated data subscription (DDS); and
provide, during the suppress mode, the particular notification to the particular processor of the wireless communication device.

18. The non-transitory computer-readable medium of claim 17,
wherein the notification is a first notification; and
wherein the one or more instructions, when executed by the one or more processors, further cause the one or more processors to:
transfer out of the suppress mode;
generate a second notification by the modem of the wireless communication device to provide current network status information to the particular processor of the wireless communication device based at least in part on transferring out of the suppress mode; and
provide the second notification from the modem of the wireless communication device to the particular processor of the wireless communication device.

19. The non-transitory computer-readable medium of claim 17, wherein the particular processor of the wireless communication device is in a low power state during the suppress mode.

20. The non-transitory computer-readable medium of claim 17, wherein the network status information relates to at least one of:
a radio access technology (RAT) change,
a non-preferred technology change, or
a non-dedicated data subscription (DDS) change.

21. The non-transitory computer-readable medium of claim 17, wherein the wireless communication device transfers to the suppress mode based at least in part on the wireless communication device being engaged in the voice call with no data activity during the voice call.

22. The non-transitory computer-readable medium of claim 17, wherein the wireless communication device transfers to the suppress mode further based at least in part on the screen of the wireless communication device being off during a data call.

23. The non-transitory computer-readable medium of claim 17, wherein the wireless communication device transfers to the suppress mode based at least in part on the wireless communication device being moved at the threshold speed and the screen of the wireless communication device being off.

24. An apparatus for wireless communication, comprising:
means for transferring to a suppress mode based at least in part on determining that a condition associated with the suppress mode is satisfied,
wherein the condition includes at least one of:
the apparatus being engaged in a voice call with no data activity during the voice call, or
the apparatus being moved at a threshold speed and a screen of the apparatus being off;
means for suppressing, during the suppress mode, generation of a notification by a modem of the apparatus that is to provide network status information to a processor of the apparatus,
the network status information relating to an alteration to a network status;
means for generating, during the suppress mode, a particular notification to provide network status information regarding a particular alteration to the network status,
wherein the particular alteration relates to at least one of:
a technology change,
a preferred technology change, or
a change to a current dedicated data subscription (DDS); and
means for providing, during the suppress mode, the particular notification to the processor of the apparatus.

25. The apparatus of claim 24, further comprising:
means for transferring out of the suppress mode;
means for generating a particular notification by the modem of the apparatus to provide current network status information to the processor of the apparatus based at least in part on transferring out of the suppress mode; and
means for providing the particular notification from the modem of the apparatus to the processor of the apparatus.

26. The apparatus of claim 24, wherein the processor of the apparatus is in a low power state during the suppress mode.

27. The apparatus of claim 24, wherein the network status information relates to at least one of:
a radio access technology (RAT) change,
a non-preferred technology change, or
a non-dedicated data subscription (DDS) change.

28. The apparatus of claim 24, wherein the apparatus transfers to the suppress mode based at least in part on the apparatus being engaged in the voice call with no data activity during the voice call.

29. The apparatus of claim 24, wherein the apparatus transfers to the suppress mode based at least in part on the apparatus being moved at the threshold speed and the screen of the apparatus being off.

30. The apparatus of claim 24, wherein the condition further includes the screen of the UE being off during a data call.

* * * * *